United States Patent [19]

Nagatomo et al.

[11] Patent Number: 4,494,383
[45] Date of Patent: Jan. 22, 1985

[54] AIR-CONDITIONER FOR AN AUTOMOBILE

[75] Inventors: Hideaki Nagatomo; Hiroto Kawahira; Toshizo Nishizawa; Mitsuo Yasuda, all of Shizuoka, Japan

[73] Assignee: Mitsubishi Denki Kabushiki Kaisha, Tokyo, Japan

[21] Appl. No.: 468,992

[22] Filed: Feb. 23, 1983

[30] Foreign Application Priority Data

Apr. 22, 1982 [JP] Japan .................................. 57-67857
May 12, 1982 [JP] Japan .................................. 57-79444

[51] Int. Cl.³ .......................... F25B 1/00; B60H 3/04
[52] U.S. Cl. .................................... 62/196.2; 62/229; 62/510; 62/243; 236/1 EA; 236/44 C
[58] Field of Search ...................... 62/196.2, 510, 133, 62/243, 228.5, 229; 236/1 EA, 44 C

[56] References Cited

U.S. PATENT DOCUMENTS 3,360,952  1/1968  Lewis .................................. 62/196.2
4,395,203  7/1983  Takada ................................. 62/133

FOREIGN PATENT DOCUMENTS 102645    8/1979  Japan .................................. 62/510
2068522  12/1980  United Kingdom .

Primary Examiner—Harry Tanner
Attorney, Agent, or Firm—Wenderoth, Lind & Ponack

[57] ABSTRACT

An air-conditioner for an automobile is disclosed which is provided with a compressor adapted to be directly connected to the engine, the compressor being provided with two coaxial compressing cylinders each having a different displacement, whereby the cylinder having the smaller displacement is adapted to be always operated to carry out the dehumidification, while the cylinder having the larger displacement is adapted to be operated only when it is desired to air-condition the compartment by a change in its operation rate through the actuation of such as a slide valve.

5 Claims, 7 Drawing Figures

AIR-CONDITIONER FOR AN AUTOMOBILE

BACKGROUND OF THE INVENTION

1. Field of the Invention

The present invention relates to an air-conditioner for an automobile and more particularly to an improvement in an air-conditioner for an automobile to control the cooling capacity without switching the compressor clutch on or off.

2. Description of the Prior Art

Conventionally the refrigerating circuit in an air-conditioner for an automobile is constituted as shown in FIG. 1 of the attached drawings. That is, in FIG. 1 the reference numeral 1 is a compressor, 2 is a condenser, 3 is a receiver-drier, 4 is an expansion valve, 5 is an evaporator, and 14 is a compressor clutch. In the refrigerating circuit comprising these elements connected in series, the refrigerant which has been compressed to a high temperature and high pressure by compressor 1 is transformed to a state in which it is at a normal temperature under the identical high pressure by the condenser 2, and after its pulsation has been eliminated in receiver-drier 3 the refrigerant is expanded by expansion valve 4, where the temperature and pressure are lowered, absorbing the heat in evaporator 5.

However, in this construction, in the case where at the time of high humidity in the passenger compartment only dehumidification of the compartment is to take place without lowering the temperature within the compartment, it has been found difficult to regulate the temperature, and also this circuit cannot be used for dehumidification unless a heating means is incorporated therewith. Further, since clutch 14 is used to transmit the rotation of the engine of the automobile to compressor 1, it brings about considerable problems in transmission loss, clutch life and also, due to its forming a considerable part of the overall weight of the compressor, in any weight reduction scheme.

A temperature-sensitive control system has been disclosed UK Patent Application GB No. 2 068 522A which comprises an automatic expansion valve and a control device, the automatic expansion valve being connected between the condenser and the evaporator to maintain a relatively constant pressure in the evaporator, and the control device includes a crankcase bypass valve which is responsive to the temperature of the refrigerant at the outlet of the evaporator for controlling the capacity of the compressor. However, this prior art does not teach the use of two compressing chambers adapted to be directly driven by an automobile engine, each having a different displacement for the control of the refrigerating capacity, i.e. the compressing chamber having a smaller displacement is always operated for dehumidification, while that having a larger displacement is only operated when the cooling is automatically or manually demanded.

SUMMARY OF THE INVENTION

It is an object of the present invention to provide an air-conditioner for an automobile which can eliminate the abovementioned defects inherent in a conventional air-conditioner of this kind.

It is another object of the present invention to provide an air-conditioner for an automobile which can eliminate the transmission loss due to the use of a clutch for transmitting the automobile engine torque to the air-conditioner and also makes it possible to reduce its weight.

It is a further object of the present invention to provide an air-conditioner for an automobile which allows the dehumidification of the passenger compartment easily throughout the year without taking into consideration the compartment temperature.

In accordance with the present invention an air-conditioner for an automobile is provided wherein the compressor comprises two cylinders, each having a different displacement, and arranged coaxially so as to have the engine rotation directly transmitted thereto without an intervening clutch, and the cylinder having a smaller displacement is adapted to always intake the refrigerant, while the cylinder having a larger displacement is adapted to either intake the refrigerant or idle without intaking it by the regulation of a slide valve incorporated therein.

Thus, in accordance with the present invention, since the refrigerating cycle for an automobile can be regulated by the mere control of the slide valve to change the operating rate of the refrigerating cycle instead of by any change-over of the clutch, the dehumidification of the compartment can be controlled readily without affecting the compartment temperature.

BRIEF DESCRIPTION OF THE DRAWINGS

These and other objects of the present invention will become more readily apparent from the following specification and with reference to the accompanying drawings, in which.

DETAILED DESCRIPTION OF THE PREFERRED EMBODIMENTS

Figure 1:
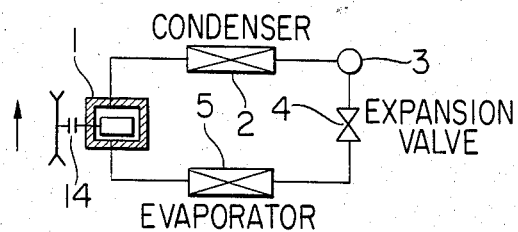
FIG. 1 shows a refrigerant circuit diagram in a conventional air-conditioner for an automobile.
Figure 2:
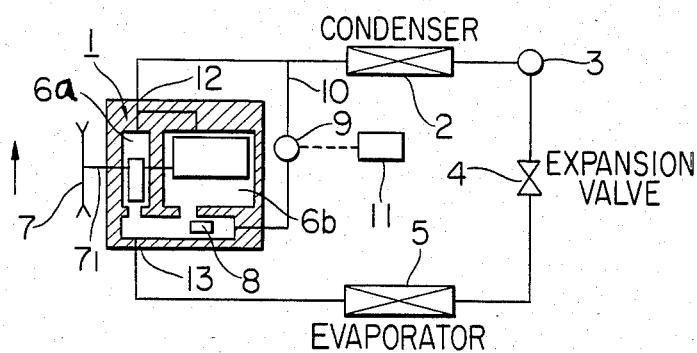
FIG. 2 shows a refrigerant circuit diagram in one embodiment of an air-conditioner for an automobile in accordance with the present invention.

Referring now to FIG. 2 of the attached drawings wherein is schematically shown an embodiment of the refrigerating circuit of an air-conditioner for an automobile in accordance with the present invention, the reference numeral 1 designates a rolling piston type variable displacement compressor provided with two cylinders, each having a different displacement, arranged coaxially and having a refrigerant flow control valve means, here shown in the form of a slide valve 8, to control the flow of the refrigerant to these two cylinders, 2 designates a condenser, 3 a receiver-drier, 4 an expansion valve, 5 an evaporator, 6a a dehumidification cylinder having a displacement equal to the smaller of the above two cylinders, 6b a refrigeration cylinder having a displacement equal to the larger of the two. Reference numeral 7 designates a pulley always transmitting engine torque to the pistons contained in cylinders 6a and 6b through a rotary shaft $7_1$, 8 a slide valve, and 9 is a switch valve to control slide valve 8. Reference numeral 10 designates a by-pass to connect slide valve 8 with the high pressure part of the refrigerant pipe, 11 a control circuit such as a thermistor to detect the temperature within the passenger compartment, a timer, etc., 12 a common discharge port from cylinders 6a and 6b, and 13 a common intake port to cylinders 6a and 6b. The above described elements 1 through 5 form a refrigerating circuit by conventionally connecting them with pipings, and the high pressure part of the piping and slide valve 8 are connected through by-pass 10 via switch valve 9 under control of the control circuit 11.

Figure 3:
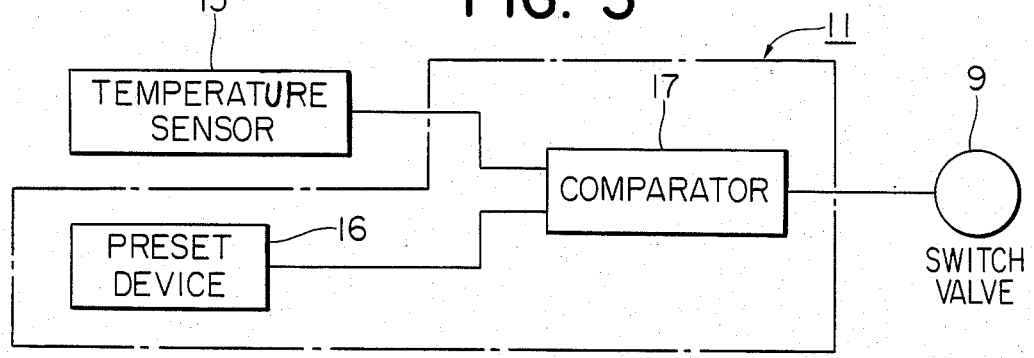
FIG. 3 shows a diagram of a regulation system for the air-conditioner shown in FIG. 2.

FIG. 3 is a detailed block diagram of control circuit 11 shown in FIG. 2, wherein the reference numeral 15 designates a temperature sensor to detect the compartment temperature, comprised of such things as a thermistor for detecting temperature, etc., and 16 a preset compartment temperature device which is manually manipulable to regulate the compartment temperature as desired. Reference numeral 17 designates a comparator to compare the signal voltage corresponding to the temperature detected by temperature sensor 15 with that of the temperature previously set by the preset device 16 and outputs an on/off signal to switch valve 9 as follows: i.e. assuming that temperature detected by temperature sensor 15 is $T_1$, and the temperature previously set by preset device 16 is $T_2$;

(i) when $(T_1-T_2) > 2°$ C. switch valve 9 is continuously on or its operation rate is 100%;

(ii) when $2°$ C. $\geq (T_1-T_2) \geq 0°$ C. switch valve 9 is on or off at an operation rate of 60%;

(iii) when $0°$ C. $\geq (T_1-T_2) \geq -1°$ C. switch valve 9 is on or off at an operation rate of 30%; and (iv) when $(T_1-T_2) < -1°$ C. switch valve 9 is continuously cut off or its operation rate is 0%.

Figure 4:
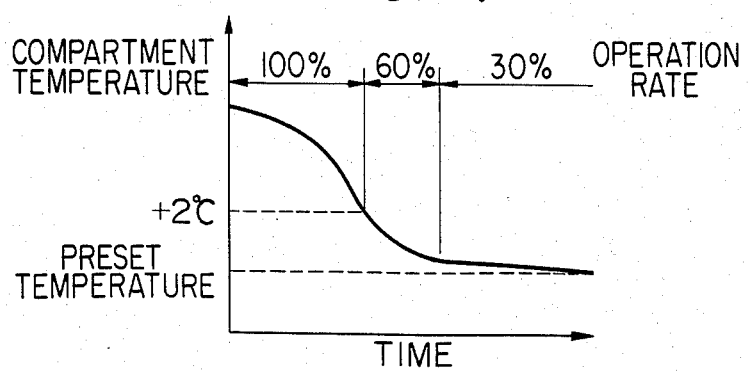
FIG. 4 shows a characteristic diagram indicating the relationship between the change in compartment temperature and the operating rate of the refrigerating circuit relative to the lapse of time in the air-conditioner shown in FIGS. 2 and 3.
Figure 5:
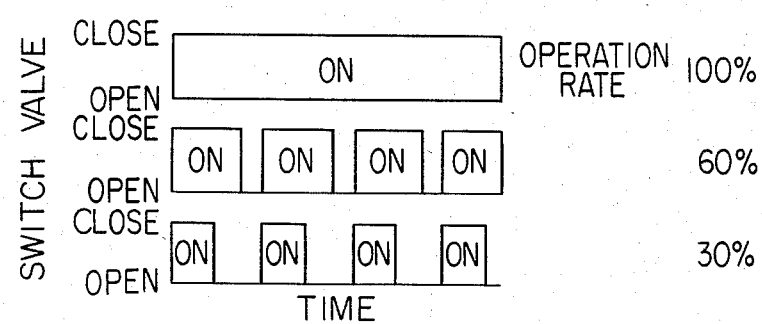
FIG. 5 is an explanatory diagram to indicate the relationship between the switching of the slide valve and the operating rate of the refrigeration cycle in the air-conditioner shown in FIGS. 2 and 3.
Figure 6:
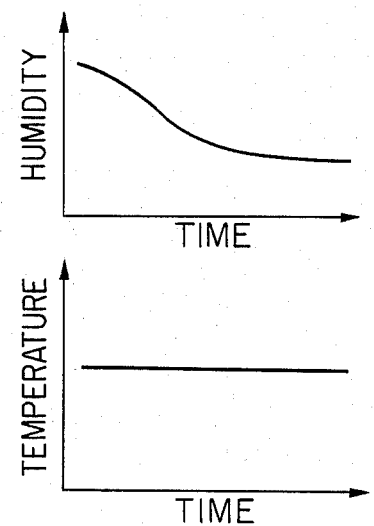
FIG. 6 shows characteristic diagrams illustrating the changes in humidity and temperature in the compartment at the time of the operation of dehumidification in the air-conditioner shown in FIGS. 2 and 3.

The operation of the refrigerating circuit in accordance with the present invention is as follows:

Pulley 7 always rotates together with the rotation of the engine and the rotation is transmitted to the two pistons of cylinders 6a and 6b directly connected to pulley 7. The refrigerant sucked through intake port 13 into the inside of compressor 1 enters into cylinder 6a and 6b having the smaller and larger displacements, respectively, and is compressed and discharged from discharge port 12, circulating in the refrigerating circuit. When the passenger in the compartment does not desire to have the compartment cooled he opens switch valve 9 by the manipulation of a switch, etc. The refrigerant gas under high pressure passes through by-pass 10 to press on slide valve 8 so that the entrance of the refrigerant gas into cylinder 6b is blocked. Owing to this measure the resulting air-conditioning capacity is limited to that produced only by cylinder 6a so that only the humidity within the compartment is eliminated without substantially affecting the compartment temperature:

When the passenger desires to cool the compartment he closes switch valve 9. Then slide valve 8 is now not being pressed by the refrigerant gas under high pressure and resumes its original position so that the refrigerant gas also enters into cylinder 6b having the larger displacement, the rated air conditioning capacity of compressor 1 being now achieved. When the compartment temperature decreases to some extent, control circuit 11 detects this decrease and opens switch valve 9, resulting in the refrigerant gas under high pressure entering into by-pass 10 to press on slide valve 8 which prevents the refrigerant from entering into cylinder 6b, only cylinder 6a now being operated. When the compartment temperature again rises to some extent or a certain time elapses, control circuit 11 detects it and closes switch valve 9. Then the refrigerant gas again enters both cylinders 6a and 6b, the air conditioning operation thus again commencing. As the compartment temperature approaches a temperature previously set by the passenger a comfortable and uniform air conditioning becomes possible by decreasing the operating rate of cylinder 6b from 100% to 60%, 30%, etc. by control circuit 11. FIG. 4 shows the changes in the compartment temperatures and the operation rate of cylinder 6b relative to the passage of time, FIG. 5 the relationship between the changes in the operation rate of cylinder 6b and the on/off switch valve 9, and FIG. 6 shows the changes in the compartment humidity and temperature relative to the passage of time at the time of the operation of cylinder 6a only.

An embodiment of the variable displacement type compressor 1 will be described with reference to FIG. 7.

Figure 7:
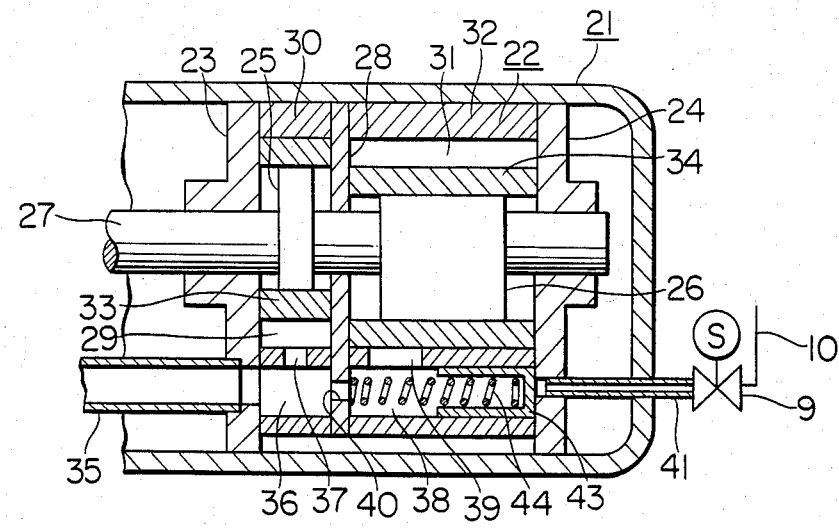
FIG. 7 is a longitudinal sectional view of an embodiment of a concrete example of the compressor shown in FIG. 2.

In FIG. 7 the reference numeral 21 represents a sealed vessel containing therein a compressor element 22; 23 and 24 designate spaced confronting bearing discs disposed within vessel 21, forming part of compressor element 22, and respectively rotatively supporting a driving shaft 27 which has eccentric discs 25 and 26 integrally secured thereon within vessel 21 between bearing discs 23 and 24. Shaft 27 carries a pulley not shown, thereon outside vessel 21. A partition wall 28 is disposed within vessel 21 between the two eccentric discs 25 and 26. Disposed within vessel 21 between partition wall 28 and bearing disc 23 is a smaller displacement cylinder 30 in which is formed a smaller displacement compressing chamber 29 coaxially with driving shaft 27 at the upstream side of the intake gas inlet, and similarly disposed within vessel 21 between partition wall 28 and bearing disc 24, is a larger displacement cylinder 32 in which is formed a larger displacement compressing chamber 31 at the downstream side of the intake gas inlet. Rolling pistons 33 and 34 are positioned within smaller and larger displacement chambers 29 and 31, respectively, so as to be rolled along the inner peripheral walls of smaller and larger displacement cylinders 30 and 32, respectively, with eccentric discs 25 and 26 being driven by driving shaft 27. An intake 35 for a refrigerant gas passes through bearing disc 23 so as to lead the refrigerant gas into smaller and larger displacement compressing chambers 29 and 31. A smaller displacement side intake passage 36 is associated with smaller displacement cylinder 30 which is in communication with smaller displacement compressing chamber 29 through a small size intake port 37. A larger displacement side intake passage 38 is associated with larger displacement cylinder 32 which is in communication with larger displacement compressing chamber 31 through a larger diameter intake port 39. An intake opening 40 is formed in partition wall 28 so as to connect smaller displacement side intake passage 36 with larger displacement side intake passage 38. A by-pass pipe 41 passes through the wall of sealed vessel 21 and bearing disc 24 so as to be in communication with larger displacement side intake passage 38, by-pass pipe 41 being provided with switch valve 9 outside vessel 21. A cylindrical slide valve 43 is slidably mounted within larger displacement side intake passage 38 with a slight clearance being left therebetween and has an axial length such that owing to the action of an axial compression spring 44 disposed between it and partition wall 28 it usually holds open larger diameter intake port 39 formed in larger displacement compressor cylinder 32.

Although in the embodiment described above a rolling piston type compressor is described as being usable in the refrigerating cycle a multi-vane type compressor or a "Wankelmotor" type compressor may also constitute a similar refrigerating means so as to operate exclusively, either for dehumidification or for air conditioning without the use of a clutch. It may also be possible to use in place of the switch valve an electromagnetic valve or a change-over valve utilizing a negative pressure induced by the engine.

Further, although in the embodiment described above the compressor is referred to as provided with one intake and one discharge port adapted to be alternately operated by a slide valve incorporated therein, it may be provided with two of each port or two of either of the ports alternately operated by the switch valve.

From the foregoing it will be appreciated that, in accordance with the present invention, as explained in connection with the embodiment, since a refrigerating cycle is constituted by a rolling piston type variable displacement compressor is provided with two concentric cylinders each having a different displacement and their operations are alternated with each other by e.g. a slide valve incorporated therein, a dehumidification operation and an air conditioning operation are made possible by the mere manipulation of the slide valve without necessitating the cooperation of a heater or temperature regulation. Further, in the present invention, since no clutch is required for transmitting engine torque to the compressor, troubles such as transmission loss, clutch life, etc. are all solved, also making the reduction of weight possible, and a stable air-conditioning operation without uneven temperatures can be achieved by changing the operation rate into several steps by the use of a thermistor, timer, etc.

While there are described and illustrated herein certain embodiments of the present invention it will be understood that modifications may be made thereto without departing from the spirit of the present invention.

What is claimed is:

1. An air-conditioner system for dehumidifying and cooling the passenger compartment of an automobile, comprising:

a compressor means, a condenser and an evaporator connected in series in a refrigerating circuit;

said compressor means having a rotary shaft adapted to be directly connected to the engine of the automobile for being constantly driven thereby, having one large and one small displacement compressing element each having a different refrigerant compressing capacity, the compressing capacity of said small displacement compressing element being just sufficient for providing sufficient refrigerant for dehumidifying the passenger compartment, and having refrigerant intake means for the respective large and small displacement compressing elements and a common refrigerant discharge connected to said condenser;

a refrigerant flow control valve means in said refrigerant intake means for the large displacement compressing element for controlling the amount of refrigerant sucked into said large displacement compressing element for causing the large displacement compressing element to compress a predetermined amount of refrigerant over a period of time, the intake to said small displacement compressing element being unvalved; and temperature setting control means connected to said refrigerant flow control valve means for controlling said refrigerant flow control valve means to provide an amount of refrigerant to said large displacement compressing element sufficient for cooling the passenger compartment to the set temperature.

2. An air-conditioner as claimed in claim 1 wherein said compressor means has a sealed vessel containing said large and small displacement compressing elements, said vessel and compressing elements constituting a variable displacement type compressor.

3. An air-conditioner as claimed in claim 2 wherein said compressing elements and said refrigerant flow control valve means is within said sealed vessel for controlling the branch for the large displacement compressing element.

4. An air-conditioner as claimed in claim 3 wherein said refrigerant flow control valve means is a slide valve, and said control means comprises means for supplying a differential pressure of refrigerant gas in said refrigerating cycle to said slide valve for controlling the position thereof.

5. An air-conditioner as claimed in claim 4 wherein said supplying means comprises a by-pass connected to said high pressure refrigerant discharge and directed to one end of said slide valve, and a switch valve in said by-pass for controlling the pressure of the refrigerant gas supplied to said slide valve, the other side of said slide valve being exposed to the refrigerant intake.

* * * * *